US008892548B2

(12) United States Patent
Lorge et al.

(10) Patent No.: US 8,892,548 B2
(45) Date of Patent: *Nov. 18, 2014

(54) ORDERING SEARCH-ENGINE RESULTS

(71) Applicant: International Business Machines Corporation, Armonk, NY (US)

(72) Inventors: Freddy Lorge, Brussels (BE); Tom O. Rojahn, Oslo (NO)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/231,866

(22) Filed: Apr. 1, 2014

(65) Prior Publication Data

US 2014/0214787 A1    Jul. 31, 2014

Related U.S. Application Data

(63) Continuation of application No. 13/622,439, filed on Sep. 19, 2012.

(51) Int. Cl.
*G06F 17/30* (2006.01)

(52) U.S. Cl.
CPC ...... *G06F 17/3053* (2013.01); *G06F 17/30864* (2013.01)
USPC .................... 707/723; 707/748; 707/E17.082

(58) Field of Classification Search
CPC .................................................. G06F 17/3053
USPC .................... 707/723, 748, 749, 954, E17.82
See application file for complete search history.

(56) References Cited

U.S. PATENT DOCUMENTS

| 6,675,159 | B1 | 1/2004 | Lin et al. |
| 7,328,209 | B2 | 2/2008 | Das et al. |
| 7,496,561 | B2 | 2/2009 | Caudill et al. |
| 7,516,123 | B2 | 4/2009 | Betz et al. |
| 7,555,472 | B2 | 6/2009 | Craig et al. |
| 7,562,074 | B2 | 7/2009 | Liddell et al. |

(Continued)

OTHER PUBLICATIONS

Ray, S.K., Singh, S., Joshi, B.P.: Question Answering Systems Performance Evaluation—To Construct an Effective Conceptual Query Based on Ontologies and WordNet. In: Proceedings of the 5th Workshop on Semantic Web Applications and Perspectives, Rome, Italy, 10 pages, Dec. 15-17. CEUR Workshop Proceedings, pp. 1613-0073 (2008).

(Continued)

*Primary Examiner* — Phong Nguyen
(74) *Attorney, Agent, or Firm* — Schmeiser, Olsen & Watts, LLP; John Pivnichny

(57) ABSTRACT

A method, process, and associated systems for ranking elements of an answer set retrieved by a conceptual search engine in response to a set of queried concepts submitted as a conceptual query. A processor of a computer system orders by relevance the semantic schemas that make up the retrieved answer set by first identifying a weight of each concept in a retrieved schema as a function of relationships among the concepts in that schema, then by identifying a semantic value of each queried concept in the retrieved schema as a function of the weights, and finally by identifying a semantic value of the query in the schema as a function of the semantic values of all queried concepts. The relative relevance of each schema may then be identified as a function of the semantic value of the query in that schema.

16 Claims, 5 Drawing Sheets

(56) References Cited

U.S. PATENT DOCUMENTS

| | | | | |
|---|---|---|---|---|
| 7,870,117 | B1* | 1/2011 | Rennison | 707/706 |
| 7,904,443 | B2 | 3/2011 | Nuneier et al. | |
| 7,974,974 | B2 | 7/2011 | Tankovich et al. | |
| 8,024,329 | B1* | 9/2011 | Rennison | 707/723 |
| 8,060,501 | B1 | 11/2011 | Harik et al. | |
| 8,122,016 | B1* | 2/2012 | Lamba et al. | 707/723 |
| 8,150,859 | B2* | 4/2012 | Vadlamani et al. | 707/748 |
| 8,321,425 | B2* | 11/2012 | Custis et al. | 707/748 |
| 8,326,842 | B2* | 12/2012 | Vadlamani et al. | 707/748 |
| 8,463,810 | B1* | 6/2013 | Rennison | 707/771 |
| 8,560,532 | B2* | 10/2013 | Lamba et al. | 707/723 |
| 8,620,909 | B1* | 12/2013 | Rennison | 707/723 |
| 2005/0086045 | A1* | 4/2005 | Murata | 704/2 |
| 2007/0174872 | A1 | 7/2007 | Jing et al. | |
| 2010/0070448 | A1* | 3/2010 | Omoigui | 706/47 |
| 2010/0114878 | A1 | 5/2010 | Lu et al. | |
| 2010/0161601 | A1 | 6/2010 | Gruber | |
| 2011/0040717 | A1 | 2/2011 | Rho et al. | |
| 2011/0047148 | A1* | 2/2011 | Omoigui | 707/723 |
| 2011/0202526 | A1 | 8/2011 | Lee et al. | |
| 2011/0295847 | A1* | 12/2011 | Cucerzan et al. | 707/723 |
| 2012/0191716 | A1* | 7/2012 | Omoigui | 707/740 |
| 2012/0209858 | A1* | 8/2012 | Lamba et al. | 707/748 |
| 2013/0311487 | A1* | 11/2013 | Moore et al. | 707/749 |

OTHER PUBLICATIONS

An et al., Discovering Semantically Similar Associations (SeSA) for Complex Mapping between Conceptual Models, 14 pages, 2008, LNCS 5231, pp. 369-382.

RCE (filed Apr. 16, 2014) for U.S. Appl. No. 13/622,439, filed Sep. 19, 2012.

IP.com, Ranking Search Results Returned from Multiple Search Engines based on a Semantic Model, IP.com No. IPCOM000216636D, IP.com Electronic Publication: Apr. 11, 2012, 7 pages.

Agrawal et al., Automated Ranking of Database Query Results, Proceedings of the 2003 CIDR Conference, 12 pages.

Shamsfard et al., ORank: An Ontology Based System for Ranking Documents, International Journal of Computer Science vol. 1, No. 3, 2006, ISSN 1306-4428, pp. 225-231.

Ray et al., Question Answering Systems Performance Evaluation—To Construct an Effective Conceptual Query Based on Ontologies and WordNet, 10 pages, (2008).

An et al., Discovering Semantically Similar Associations (SeSA) for Complex Mapping between Conceptual Models, 14 pages, (2008).

PageRank, [retrieved on Jun. 5, 2012], Retrieved from the Internet:< URL: http://en.wikipedia.org/wiki/PageRank>, 16 pages.

Office Action (Mail Date Jan. 14, 2014) for U.S. Appl. No. 13/622,439, filed Sep. 19, 2012.

Response (filed Feb. 24, 2014) for U.S. Appl. No. 13/622,439, filed Sep. 19, 2012.

Notice of Allowance (Mail Date Mar. 20, 2014) for U.S. Appl. No. 13/622,439, filed Sep. 19, 2012.

Office Action (mail date Apr. 24, 2014) for U.S. Appl. No. 13/622,439, filed Sep. 19, 2012.

Amendment (filed May 29, 2014) for U.S. Appl. No. 13/622,439, filed Sep. 19, 2012.

* cited by examiner

ORDERING SEARCH-ENGINE RESULTS

This application is a continuation application claiming priority to Ser. No. 13/622,439, filed Sep. 19, 2012.

TECHNICAL FIELD

The present invention relates to ranking results returned by a search engine in response to a conceptual query.

BACKGROUND

A computerized search engine that identifies concepts in an input query may more intelligently analyze the query's intended meaning and produce more relevant search results.

BRIEF SUMMARY

A first embodiment of the present invention provides a method for ranking answers to a conceptual query, said method comprising:

a processor of a computer system receiving the conceptual query, wherein said query comprises a set of queried concepts of a general set of concepts;

said processor receiving a set of semantic schemas, wherein said set of semantic schemas comprises a received subset of concepts of said set of queried concepts and further comprises a plurality of relationships, wherein a relationship of said plurality of relationships relates two or more concepts of said general set of concepts, wherein a first schema of said set of semantic schemas comprises a first subset of concepts of said received subset of concepts, a second concept of said general set of concepts, a third concept of said general set of concepts, and a first set of relationships of said plurality of relationships, wherein said first subset of concepts comprises a first concept of said received subset of concepts, wherein a first relationship of said first set of relationships relates said first concept to said second concept, wherein said first relationship is associated with a first relationship strength of a plurality of relationship strengths, wherein said first concept is associated with a first concept weight within said conceptual query of a set of concept weights, wherein said second concept is associated with a second concept strength of a set of concept strengths, and wherein said second concept is associated with a second semantic weight in said first schema of a set of semantic weights;

said processor identifying a first semantic value of said first schema to said query as a function of said first subset of concepts and as a further function of said first set of relationships;

said processor identifying a first relative relevance of said first schema to said query as a function of said first semantic value of said first schema to said query; and said processor ranking said first schema among said set of semantic schemas as a function of said first relative relevance.

A second embodiment of the present invention provides a computer program product, comprising a computer-readable hardware storage device having a computer-readable program code stored therein, said program code configured to be executed by a processor of a computer system to implement a method for ranking answers to a conceptual query, said method comprising:

said processor of a computer system receiving the conceptual query, wherein said query comprises a set of queried concepts of a general set of concepts;

said processor receiving a set of semantic schemas, wherein said set of semantic schemas comprises a received subset of concepts of said set of queried concepts and further comprises a plurality of relationships, wherein a relationship of said plurality of relationships relates two or more concepts of said general set of concepts, wherein a first schema of said set of semantic schemas comprises a first subset of concepts of said received subset of concepts, a second concept of said general set of concepts, a third concept of said general set of concepts, and a first set of relationships of said plurality of relationships, wherein said first subset of concepts comprises a first concept of said received subset of concepts, wherein a first relationship of said first set of relationships relates said first concept to said second concept, wherein said first relationship is associated with a first relationship strength of a plurality of relationship strengths, wherein said first concept is associated with a first concept weight within said conceptual query of a set of concept weights, wherein said second concept is associated with a second concept strength of a set of concept strengths, and wherein said second concept is associated with a second semantic weight in said first schema of a set of semantic weights;

said processor identifying a first semantic value of said first schema to said query as a function of said first subset of concepts and as a further function of said first set of relationships;

said processor identifying a first relative relevance of said first schema to said query as a function of said first semantic value of said first schema to said query; and said processor ranking said first schema among said set of semantic schemas as a function of said first relative relevance.

A third embodiment of the present invention provides a computer system comprising a processor, a memory coupled to said processor, and a computer-readable hardware storage device coupled to said processor, said storage device containing program code configured to be run by said processor via the memory to implement a method for ranking answers to a conceptual query, said method comprising:

said processor of a computer system receiving the conceptual query, wherein said query comprises a set of queried concepts of a general set of concepts;

said processor receiving a set of semantic schemas, wherein said set of semantic schemas comprises a received subset of concepts of said set of queried concepts and further comprises a plurality of relationships, wherein a relationship of said plurality of relationships relates two or more concepts of said general set of concepts, wherein a first schema of said set of semantic schemas comprises a first subset of concepts of said received subset of concepts, a second concept of said general set of concepts, a third concept of said general set of concepts, and a first set of relationships of said plurality of relationships, wherein said first subset of concepts comprises a first concept of said received subset of concepts, wherein a first relationship of said first set of relationships relates said first concept to said second concept, wherein said first relationship is associated with a first relationship strength of a plurality of relationship strengths, wherein said first concept is associated with a first concept weight within said conceptual query of a set of concept weights, wherein said second concept is associated with a second concept strength of a set of concept strengths, and wherein said second concept is associated with a second semantic weight in said first schema of a set of semantic weights;

said processor identifying a first semantic value of said first schema to said query as a function of said first subset of concepts and as a further function of said first set of relationships;

said processor identifying a first relative relevance of said first schema to said query as a function of said first semantic value of said first schema to said query; and said processor ranking said first schema among said set of semantic schemas as a function of said first relative relevance.

A fourth embodiment of the present invention provides a process for supporting computer infrastructure, said process comprising providing at least one support service for at least one of creating, integrating, hosting, maintaining, and deploying computer-readable program code in a computer system, wherein the program code in combination with said computer system is configured to implement a method for ranking answers to a conceptual query, said method comprising:

a processor of a computer system receiving the conceptual query, wherein said query comprises a set of queried concepts of a general set of concepts;

said processor receiving a set of semantic schemas, wherein said set of semantic schemas comprises a received subset of concepts of said set of queried concepts and further comprises a plurality of relationships, wherein a relationship of said plurality of relationships relates two or more concepts of said general set of concepts, wherein a first schema of said set of semantic schemas comprises a first subset of concepts of said received subset of concepts, a second concept of said general set of concepts, a third concept of said general set of concepts, and a first set of relationships of said plurality of relationships, wherein said first subset of concepts comprises a first concept of said received subset of concepts, wherein a first relationship of said first set of relationships relates said first concept to said second concept, wherein said first relationship is associated with a first relationship strength of a plurality of relationship strengths, wherein said first concept is associated with a first concept weight within said conceptual query of a set of concept weights, wherein said second concept is associated with a second concept strength of a set of concept strengths, and wherein said second concept is associated with a second semantic weight in said first schema of a set of semantic weights;

said processor identifying a first semantic value of said first schema to said query as a function of said first subset of concepts and as a further function of said first set of relationships;

said processor identifying a first relative relevance of said first schema to said query as a function of said first semantic value of said first schema to said query; and said processor ranking said first schema among said set of semantic schemas as a function of said first relative relevance.

DETAILED DESCRIPTION

Figure 1:
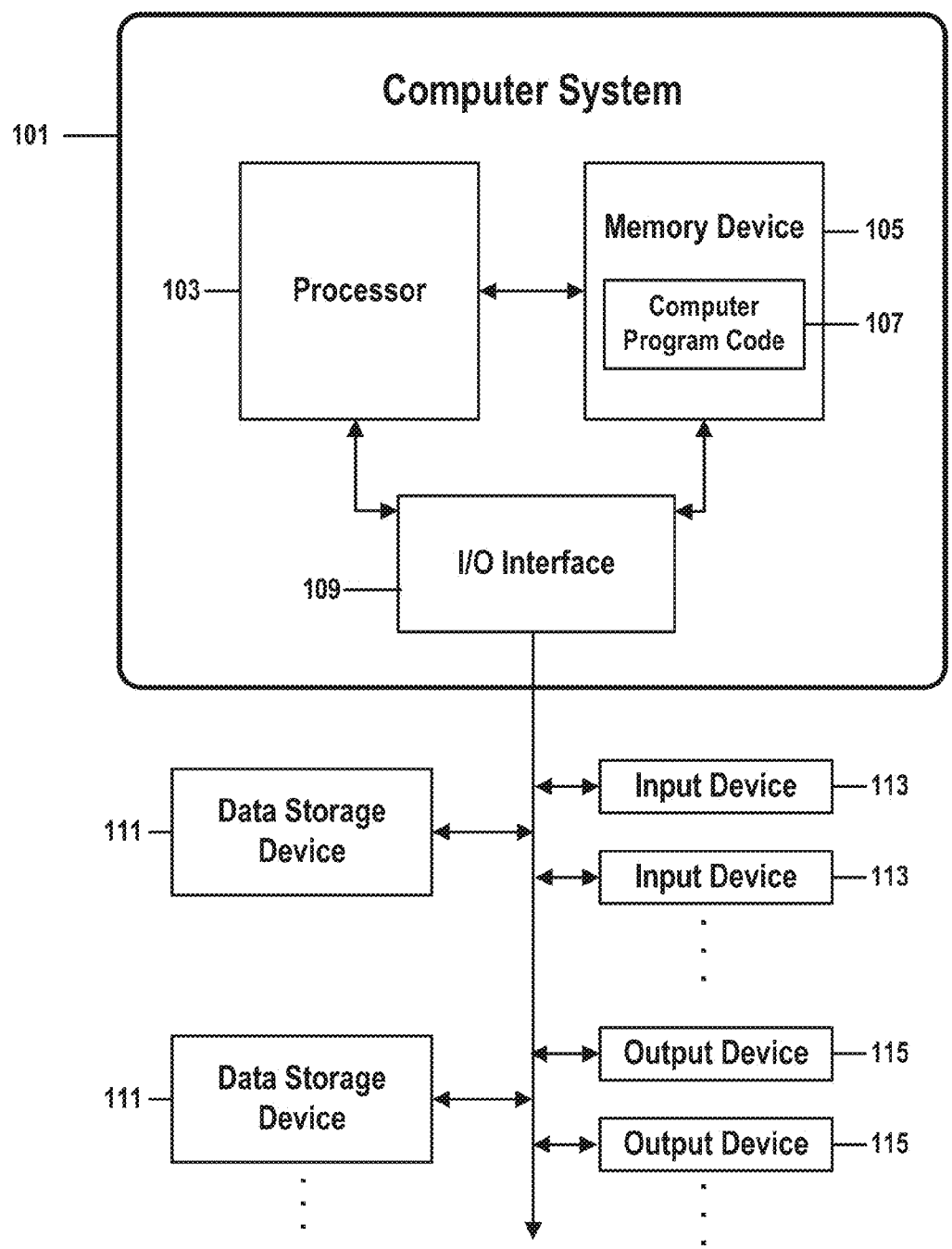
FIG. 1 shows a structure of a computer system and computer program code that may be used to implement a method for ranking answers to a conceptual query in accordance with embodiments of the present invention.

The present invention provides a method, a computer system, a computer program product, and a service that allow a search engine to efficiently rank conceptual schemas retrieved by the search engine in response to a user query, wherein the ranked schemas are ordered by each ranked schema's relative relevancy to one or more concepts comprised by the user query.

Here, a conceptual schema comprises a set of concepts and a set of relationships between those concepts, wherein the concepts and relationships are defined within the context of an information domain. A conceptual schema may be associated with or may describe one or more information-bearing entities, wherein such entities may comprise, but are not limited to Web pages, Web sites, databases, documents, or combinations thereof.

A computerized search engine may identify information-bearing content in response to a user-submitted query, wherein the query may be comprised of character strings (or "keywords"). Such identified information-bearing content may comprise, but is not limited to, Web pages, Web sites, databases, documents, or combinations thereof, and may be identified by the search engine because it comprises a keyword submitted in the user query. A Web site, a Web page, and other types of visual content that need not display a keyword in order to comprise the keyword. A search engine may, for example, identify a Web page as comprising a keyword if the keyword is embedded within the Web page's source code as invisible "metadata."

In a common implementation of this procedure, a search-engine user searches for content by submitting a search query to the search engine, wherein the query comprises one or more keywords of interest to the user. The engine responds to the query with an answer set of retrieved Web pages, documents, database entries, or other instances of information-bearing content. Such an answer set may comprise many retrieved results, so a search engine may attempt to rank and display these retrieved results in an order that approximates each result's relative relevance to the query or to keywords comprised by the query. A search engine that can identify and rank these relevances may produce more useful and more easily understood results.

A search engine may identify a relevance of a retrieved result in an answer set by considering criteria that comprise, but are not limited to, a number of queried keywords contained in the retrieved result, a number of instances of one or more queried keywords contained in the retrieved result, or a number of times other retrieved results in the answer set hyperlink to or refer to the retrieved result.

In embodiments of the present invention, a search engine may more accurately identify a relevance of a retrieved result to a user-submitted query if the engine understands an intended meaning of a keyword comprised by the query. This understanding may comprise interpreting the user submission as a "conceptual query." Instead of interpreting a queried keyword as a mere character pattern to be matched, a search engine may interpret the queried keyword in a conceptual query as an instance of a "concept" that associates the keyword with a semantically related meaning. In some embodiments, a concept may be associated with many semantically related keywords (or "instances" of the concept), and a keyword may be associated with more than one concept.

In an example, a concept named "America" may be associated with a set of semantically related instances {"United States", "USA", "US", "U.S.A.", "U.S."}. If a user submits a conceptual query "population USA," the search engine may identify the queried keyword "USA" as an instance of the concept "America." This identification might allow the search engine to assign higher relevance to a retrieved result Web page, regardless of whether the retrieved result contains the queried string "USA," if the retrieved result comprises a greater number of instances of the concept "America," comprises a greater number of character strings that are semantically related to concept "America" in a schema associated with the retrieved result, or comprises a greater number of instances of other concepts that that are semantically related to the concept of "America" in a schema associated with the retrieved result.

In a nonconceptual query, the search engine might not have related the queried conceptual keyword "USA" to other instances of the concept "America" and would thus fail to identify the relevance imparted to a retrieved result if that result comprises instances of strings "United States," "US," "U.S.A.," or "U.S." In a nonconceptual query, the search engine might not have related the queried conceptual keyword "USA" to instances of another concept that is semantically related to the concept "America" and would thus fail to identify the relevance imparted to a retrieved result that comprises instances of concepts related to "America," wherein such related concepts might include "nation" or "continent."

The usefulness of a conceptual query may be enriched when an information-bearing entity is associated with a "conceptual schema," which is a structural framework that represents information in an information-bearing entity as a set of concepts and a set of relationships among those concepts. In some embodiments, such a conceptual schema may be called a "semantic" schema because it contains information about the semantic meanings of concepts. The meaning of a concept within a particular conceptual schema may be specific to the context of the schema, which is known as the schema's "domain." In some cases, a meaning of a concept within a particular schema may be a function of a domain of the schema.

A first concept may thus be associated with the same semantic meaning in multiple conceptual schemas, but another concept may be associated with a set of conceptual schemas that each associate the concept with a different meaning. A set of conceptual schemas may therefore each associate a queried keyword with a different semantic meaning, even if each schema associates the keyword with an identically named concept.

When a query comprises a keyword that is an instance of a concept comprised by a conceptual schema, that concept may have a schema-specific "relevance within the schema" to the query that differs from the concept's relevance within other schemas to the query. Similarly, a conceptual schema that comprises a concept associated with a queried keyword may itself have a schema-specific relevance to a query that comprises the keyword.

A relevance of a conceptual schema, as well as a relevance of a retrieved search-engine result associated with the schema, to a query that comprises a keyword instance of a concept comprised by the schema may therefore be a function of a choice of schema. In an example, consider two schema that each comprise a concept named "America." This concept may be associated with a meaning related to a nation "America" within a domain of the first schema, but may be associated with a different meaning related to a continent "America" within a domain of the second schema. In this example, if a query that contains a keyword "USA," wherein "USA" is an instance of concept "America" in only the first schema, the relevance of concept "America" within the first schema to the query might be greater than the relevance of concept "America" within the second schema. Accordingly, a first information-bearing entity, such as a first Web page, associated with the first schema might have greater relevance to the query than would a second information-bearing entity, such as a second Web page, associated with the second schema.

A conceptual search engine that implements an embodiment of the present invention may thus rank members of an answer set retrieved in response to a query by ranking a relative relevance of each retrieved member's associated schema to the query.

In an example, if a user submits a search-engine query that comprises a keyword "body," a search engine might respond with an answer set that comprises a set of conceptual schemas. Each candidate schema might interpret the queried keyword "body" within a context of the schema's domain, likely as an instance of a concept comprised by the schema, and each of those interpretations might associate the schema with a different degree of relevance to the query.

A conceptual schema specific to an auto-industry domain might, for example, be associated with a car manufacturer's Web site. Such a schema might comprise an automobile-specific concept named "bodywork." By logically associating the concept "bodywork" with the queried keyword "body," such a schema might associate the queried keyword with a meaning associated with automobile bodywork, thus adding semantic meaning to the query and helping the search engine assign relevance to documents that target the auto industry A second schema associated with an airplane-industry Web site, however, might comprise a different set of semantic meanings and relationships that associate a queried keyword "body" to a concept named "fuselage." Logically relating a keyword "fuselage" with the query might then facilitate the retrieval of documents relevant to the airline industry and occurrences of the string "fuselage" in the airplane-industry Web site might increase the relevance of the second schema and of the airplane-industry site to the query.

A conceptual search engine may respond to a query of the World Wide Web, the semantic Web, an intranet, an extranet, a database, or other large information repository by retrieving an answer set that comprises a large number of information-bearing entities that are each associated with a conceptual schema. Embodiments of the present invention provide a method by which a conceptual search engine may efficiently identify and rank members of such an answer set in order of relevancy to the query, enabling the search engine to display more relevant retrieved items first.

Such identification and ranking requires a way to express and quantify a relevancy of a schema. In embodiments of the present invention, this expression and quantification may be accomplished as a function of a "semantic value" of a concept, schema, query, or other entity.

If a schema S comprises a concept C and a query Q comprises a keyword character string that is associated with or is an instance of the concept C, then a relevancy of the schema S to the query Q may be expressed as a function of:
  i) the semantic value that schema S brings to concept C;
  ii) the semantic value of concept C within schema S; or
  iii) the contribution of concept C to the semantic value of schema S.

If a search engine retrieves a set of conceptual schemas in response to a query Q, wherein Q comprises a concept C, the present invention may thus rank a retrieved schema S higher within the set of retrieved schemas if: i) S brings greater semantic value to C than other schemas bring to C; ii) C has greater semantic value within S than it does within other schemas; or iii) C makes a greater contribution to the semantic value of S than it does to the semantic value of a different schema.

This method of ranking requires a way to quantify the "semantic value" associated with a schema, concept, or query. This quantification may be performed by assigning a "weight" value to a concept within a schema, wherein the weight of the concept within the schema may be a function of the concept's relationships within the schema to other concepts within the schema. In some embodiments, the weight of a concept within a schema may be referred to as a strength of the concept within the schema.

A relationship between a pair of concepts in a schema may comprise a chain of links that connects the pair of concepts. A chain is a sequence of links, wherein each link connects two concepts and every link is a special case of a chain. Concepts $C_1$ and $C_2$, for example, might be connected through a single link denoted $(C_1,C_2)$ or, in some embodiments, denoted as $lnk(C_1,C_2)$. But if concepts $C_1$ and $C_4$ are connected through two intermediary concepts $C_2$ and $C_3$, the chain connecting $C_1$ and $C_4$ might be represented as a three-link chain (an ordered sequence of three links)

$$ch(C_1,C_4)=(C_1,C_2)(C_2,C_3)(C_3,C_4).$$

By default, a single link has a "length" of one, but a particular link may be assigned an arbitrary value in order to weight the relevance of concepts connected by the link or better represent a relationship between concepts connected by the link. A link between two equivalent concepts, for example, might be assigned a default length of zero, and a link between two closely related concepts might be assigned a nonzero length less than one. In other embodiments, a link might be assigned a variable length that is a function of a characteristic of a query or schema, such as the existence of a certain pattern of keywords in the query. A length of a chain may be a sum of the lengths of the links that comprise the chain. A concept in a schema is always equivalent to itself within that schema.

A "strength" of a chain may be an inverse function of the length of the chain. A shorter chain may thus identify a stronger relationship between the pair of concepts that terminate the chain.

In embodiments described herein, if concepts C1 and C2 are connected by more than one chain within a schema, the strength of a relationship between C1 and C2 may be a strength of a strongest chain between C1 and C2. a strength of a chain between two concepts or of a relationship between two concepts may be defined differently in other embodiments.

Given a link $lnk_i$ and a chain $ch=\{lnk_1, lnk_2, \ldots, lnk_k\}$, we define:

$L(lnk_i)$=Length of link $lnk_i$
$L(ch)=\Sigma_{i=1 \ldots k} L(lnk_i)$=Length of chain ch
$Str(lnk_i)$=Strength of link $lnk_i$
$Str(ch)$=Strength of chain ch One or more implementation-dependent functions may be used to quantify the strength of a link or the strength of a chain. In a simple example that accommodates zero lengths, the strength of a chain or link may be defined as the inverse of the sum of one plus the length of the chain or link:

$$Str(lnk)=1/(1+L(lnk))$$

$$Str(ch)=1/(1+L(ch))$$

An analogous strength parameter Str(C, S) may also be associated with a concept C within a schema S, wherein Str(C,S) may be proportional to the relevance of C within S, and wherein Str(C,S) may be a function of a choice of schema S. In an example, the concept "fuel efficiency" might have greater relevance (and thus greater strength) within a schema defined within a more closely related "auto industry" domain than it would within a schema defined within a less closely related "natural disaster" domain.

The Str strength and L length operators may be functions of the schema within which a link, chain, concept, or other entity is defined. In some embodiments, for example, strength of a link between concept C1 and concept C2 in a schema S1 may not match the strength of a link between C1 and C2 in a schema S2. In order to simplify notation in the examples presented herein, we may omit the schema from the list of parameters in some definitions of Str and L operators. This should not, however, be construed to imply that these operators cannot be functions of schema choice.

A concept may also have greater strength within a schema or domain that comprises multiple instances of the concept. A concept "computer manufacturer" might, for example, be strong in a schema defined within a domain of a Web site that refers repeatedly to IT providers "IBM," "HP," and "Oracle," wherein "IBM," "HP," and "Oracle" are instances of the concept "computer manufacturer."

In embodiments described herein, a concept may have a default strength of one, but, in other embodiments, the strength of a concept may be assigned a different default value or may be assigned a default value that is a function of other parameters.

The "semantic weight" SW(C,S) of a concept C within a schema S, wherein C is directly linked to n concepts $\{C1 \ldots Cn\}$ within S by a set of n links $\{lnk(C,C1) \ldots lnk(C,Cn)\}$ within S, may be a function of a strength Str(C,S) of C within schema S, and to a strength of each link in the set of n links.

One such function might identify a semantic weight of C within S of:

$$SW(C, S) = Str(C, S) * \sum_{i:1 \ldots n} Str(lnk(C, C_i)) \text{ or}$$

$$= Str(C, S) * \sum_{i:1 \ldots n} Str((C, C_i)) \text{ [simplified alternative notation]}$$

If, for example, concept C is directly linked in schema S to concepts C1, C2, and C3, and:
Str(C,S)=1.1
Str((C,C1))=1.5
Str((C,C2))=0
Str((C,C3))=2
then the semantic weight of C within schema S equals:

$$SW(C, S) = Str(C, S) * \sum_{i:1 \ldots 3} Str((C, C_i))$$

$$= 1.1 * [Str((C, C1)) + Str((C, C2)) + Str((C, C3))]$$

$$= 1.1 * [1.5 + 0 + 2]$$

$$= 1.1 * 3.5$$

$$= 3.85$$

Embodiments of the present invention may identify and rank a relevance of a retrieved result to a query by identifying a "semantic value" of a schema associated with the result. A semantic value of a schema S may be a function of a set of semantic values of concepts within S. In one example, a semantic value of a schema S to a query Q, wherein query Q comprises concepts C1, C2, and C3, may be proportional to a sum of the semantic value of C1 within S, the semantic value of C2 within S, and the semantic value of C3 within S.

A semantic value of a concept may be a function of both the concept and of the schema that comprises the concept. In other words, a concept C that is comprised by both schema S1 and by S2 may have a semantic value within S1 that differs from the semantic value of C in S2.

A semantic value SV(C,S) of a concept C within a schema S may be identified as a function of a set of semantic weights of a set of other concepts {C1 ... Cn} within S and of a set of chain strengths of each chain that connects C to a concept of the set of other concepts {C1 ... Cn}.

Two concepts that are separated by a shorter chain (that is, a chain that has fewer links or a smaller length value) may have semantic values that are closer in value. Two concepts that are equivalent may be connected by a chain of zero length, and may have identical semantic values.

In an example based on embodiments described herein, a schema S may comprise a concept C, a set of concepts {C1 ... Cn}, and a set of chains {ch(C,C1) ... ch(C,Cn)}, wherein an $i^{th}$ chain ch(C,Ci) in the set of chains connects concept C to an $i^{th}$ concept Ci of the set of concepts. In this example, a semantic value SV(C,S) of the concept C in the schema S might be a function of a strength of the chain ch(C,Ci) weighted by a semantic weight of the concept Ci. In a similar example, SV(C,S) might be a function of a sum or product of the strength in S of all chains {ch(C,C1) ... ch(C,Cn)}, wherein a strength in S of one of these chain (C,Ci) is weighted by a corresponding semantic weight in S of concept Ci. Other embodiments may identify a semantic value as a different, possibly implementation-specific, function.

In embodiments described herein, a semantic value of a concept C in a schema S, wherein C is related respectively to concepts {C1 ... Cn} in S by chains {ch(C,C1) ... ch(C,Cn)} in S, may thus equal:

$$SV(C,S) = \Sigma_{i:1\ldots n}[SW(Ci,S) * Str(ch(C,Ci))]$$

In another example, a query Q comprises one concept C and a schema S comprises concepts C, C1, and C2 and chains ch(C,C1) and ch(C,C1), wherein ch(C,C1) is the strongest chain that relates C to C1 within S and ch(C,C2) is the strongest chain that relates C to C2 within S. In this example, if we assign semantic weights within S to concepts C1 and C2 and assign strengths within S to chains ch(C,C1) and ch(C,C2):

SW(C1,S)=1.1
SW(C2,S)=1.2
Str(ch(C,C1))=1.4
Str(ch(C,C2))=1.0 then the semantic value of concept C within schema S is equal to:

$$SV(C,S) = \sum_{i:1\ldots 2}[SW(Ci,S) * Str(ch(C,Ci))]$$
$$= [SW(C1,S) * Str(ch(C,C1))] + [SW(C2,S) * Str(ch(C,C2))]$$
$$= [1.1 * 1.4] + [1.2 * 1.0]$$

-continued
$$= 1.54 + 1.2$$
$$= 2.74$$

As described above, if a search engine responds to a query Q that comprises a single concept C by retrieving an answer set that comprises a plurality of schemas that each comprise concept C, the semantic value of C in a retrieved schema S may identify a relative ranking of S within the set of retrieved schemas. This ranking may be used to sort the members of the answer in order of relevance to query Q.

A search engine may respond to a query Q that comprises a plurality of concepts {C1 ... Cn} by retrieving an answer set that comprises a plurality of schemas, wherein each schema of the answer set comprises a concept Ci of the plurality of concepts {C1 ... Cn} comprised by Q. In such a case, wherein Q comprises more than one concept, some embodiments of the present invention may identify a semantic value SV(Q,S), which may be expressed equivalently as either the semantic value of schema S to query Q or as the semantic value of query Q to schema S, as:

$$SV(Q,S) = \Sigma_{i:1\ldots n}[SV(Ci,S)]$$

In some embodiments, if a query Q comprises a concept Ci, but a retrieved schema S does not comprise Ci, then SV(Ci,S), a semantic value of a Ci within S, may be equal to zero.

In some embodiments, a weighting may be applied to a concept C, wherein C is comprised by a query Q or by a schema S. Such a weighting may be selected in order to more accurately represent a relative importance of the concept within the query or the schema.

A semantic value of a query Q may be a simple sum of the semantic values of each concept of a set of concepts comprised by the query Q. But when a concept of the set of concepts comprised by Q is weighted, a simple summation of the semantic values of every concept comprised by Q may not accurately identify a semantic value of the query, or of the query within a schema S.

In such cases, wherein Ci is a weighted concept of a plurality of concepts {C1 ... Cn} comprised by a query Q, a weighted semantic value of a query Q within a schema S may be a function of wt(Ci,Q), a weight of a concept Ci within Q, and may be a further function of SV(Ci,S), a semantic value of concept Ci within schema S.

In an embodiment described herein, such a weighted semantic value of a query Q within a schema S, denoted here as SV(Q,S), may be identified by the following formula:

$$SV(Q,S) = \Sigma_{i:1\ldots n}[SV(Ci,S) * wt(Ci,Q)]$$

In an example, a query Q comprises a set of three concepts {C1, C2, C3}, wherein C1, C2, and C3 have respective weightings wt(Ci,Q) of (C1,Q)=1.0, (C2,Q)=2.0, and (C3,Q)= 3.0. These weightings may identify C2 as having twice the relevance of C1 and may identify C3 as having three times the relevance of C1.

If a search engine in this example responds to a query Q by retrieving an answer set that comprises candidate schemas S1 and S2, each concept Ci may have a first semantic value SV(Ci,S1) within schema S1 and a second semantic value SV(Ci,S2) within schema S2. In this example, we assume the respective semantic values of concepts C1, C2, and C3 in S1 to be SV(C1,S1)=3, SV(C2,S1)=1, and SV(C3,S1)=0, and assume the respective semantic values of C1, C2, and C3 in S2 to be SV(C1,S2)=0, SV(C2,S2)=1, and SV(C3,S2)=2.

In summary:

| | | |
|---|---|---|
| wt(C1, Q) = 1.0 | wt(C2, Q) = 2.0 | wt(C3, Q) = 3.0 |
| SV(C1, S1) = 3 | SV(C2, S1) = 1 | SV(C3, S1) = 0 |
| SV(C1, S2) = 0 | SV(C2, S2) = 1 | SV(C3, S2) = 2 |

Here, our original unweighted equation would identify an unweighted semantic value SV(Q,S1) of query Q within schema S1 that is greater than an unweighted semantic value SV(Q,S2) of query Q within schema S2:

$$SV(Q, S1) = \sum_{i:1 \ldots 3} [SV(Ci, S1)]$$
$$= SV(C1, S1) + SV(C2, S1) + SV(C3, S1)$$
$$= 3 + 1 + 0$$
$$= 4$$

$$SV(Q, S2) = \sum_{i:1 \ldots 3} [SV(Ci, S2)]$$
$$= SV(C1, S2) + SV(C2, S2) + SV(C3, S2)$$
$$= 0 + 1 + 2$$
$$= 3$$

Our alternate method, however, which accounts for concept weightings, returns a more accurate result that identifies schema S2 as being more relevant to query Q:

$$SV(Q, S1) = \sum_{i:1 \ldots 3} [SV(Ci, S1) * wt(Ci, Q)]$$
$$= 3 * 1.0 + 1 * 2.0 + 0 * 3.0$$
$$= 3 + 2 + 0$$
$$= 5$$

$$SV(Q, S2) = \sum_{i:1 \ldots 3} [SV(Ci, S2) * wt(Ci, Q)]$$
$$= 0 * 1.0 + 1 * 2.0 + 2 * 3.0$$
$$= 0 + 2 + 6$$
$$= 8$$

These examples illustrate embodiments of the present invention that identify changes in a semantic value of a more important, more heavily weighted, concept comprised by the schema as having a greater effect on a relevance of the schema. This may occur in cases that may comprise, but are not limited to, a case wherein a query or schema comprises a primary, critical concept and a less important concept. In such a case, the query or schema will gain more relevance if a semantic value of its primary, critical concept increases by an amount, than it would if a semantic value of its less important concept increases by the same amount.

In another illustration of how weighting may be used to tailor conceptual search engine results, consider an "inclusive-OR" type query that seeks results that comprise at least one queried concept, but attributes no greater relevance to a result that comprises an additional concept.

An embodiment of the present invention might implement this requirement without implementing concept weighting. If a search engine responds to query that comprises unweighted concepts C1, C2, and C3 by retrieving schemas S1 and S2, wherein S1 does not comprise C1 or C2, the resulting semantic values might be: SV(C1,S1)=SV(C2,S1)=0 and SV(C3, S1)=100; and SV(C1,S2)=SV(C2,S2)=SV(C3,S2)=10. In this unweighted example, the semantic value SV(Q,S1)=100 would be greater than the SV(Q,S2)=30, and the relative relevance of the two schemas would be a function of the cumulative semantic values of all queried concepts comprised by each schema.

But in another case, a query might seek only schemas that contain all concepts CQ={C1 . . . Cp} comprised by Q. In such a schema, every concept Ci∈CQ would have a nonzero semantic value within the schema. Here, more accurate results may be obtained by representing query Q as a p-dimensional tensor Tp(Q), wherein an ith axis of this p-dimensional space may be calibrated in units of a magnitude of the weight of concept Ci of the set CQ. Tp(Q) might thus comprise a p-tuple, wherein an $i^{th}$ coordinate of the p-tuple is a function of the weighted value of corresponding concept Ci in Q.

In this and similar embodiments, a query Q that comprises p concepts may be represented as a p-dimensional tensor drawn from an origin of a p-dimensional coordinate system to an other endpoint of the tensor, wherein a coordinate of the other endpoint is a function of a weighted or unweighted semantic value of one of the p concepts comprised by Q. In such a representation, a weight of such a concept Ci comprised by query Q may be expressed as a semantic value of Ci in Q. Hence, the p-dimensional tensor representing the query is a representation of an intrinsic semantic value of the query with respect to the concepts it comprises, wherein this intrinsic semantic value of the query is independent of any schema or of a semantic value of any schema.

Similarly, a schema that comprises a set of p concepts may be represented in p-dimensional space as a p-dimensional tensor drawn from an origin of a p-dimensional coordinate system to an other endpoint of the tensor, wherein a coordinate of the other endpoint is a function of a weighted or unweighted semantic value of one of the p concepts comprised by the schema. If a schema and a query comprise identical sets of p concepts, the schema and the query may be represented as tensors in identical p-space. In such a representation, a p-dimensional tensor representing the schema may be identified as a representation of a semantic value of the schema with respect to the p concepts comprised by the query.

In embodiments of the present invention that comprise such representations, a query Q may be represented as either a first p-tuple or as a first p-dimensional tensor between an origin of a p-dimensional coordinate system and a first point identified in conceptual p-space by the first p-tuple. Similarly, in such representations, a semantic value of a schema S retrieved in response to the query may be represented as either a second p-tuple or as a second p-dimensional tensor between the origin of the p-dimensional coordinate system and a second point identified in conceptual p-space by the second p-tuple.

Such representations may be used to rank the relative relevance of retrieved schemas by defining a relevance of S to Q as a function of a magnitude of a distance between the first p-tuple, which identifies the p-dimensional semantic query Q, and the second p-tuple, which identifies a p-dimensional semantic value of schema S. In such embodiments, because a shorter distance between a pair of points in conceptual p-space might imply that semantic values of the pair of points are closer in value, a schema and a query represented by points that are separated by less distance in p-space may thus have greater relevance to each other.

In some embodiments, the distance between a pair of p-tuples, wherein one p-tuple of the pair represents a query Q in p-space and the other p-tuple of the pair represents a semantic value of a schema S in p-space, may not accurately represent the relative relevance of the schema S to the query Q.

In such cases, a first schema that lies closer in multidimensional concept space to a query may be attributed greater relevance to the query than a second schema that has a higher weighted semantic value than the first schema.

Embodiments of the present invention may address these issues by selecting alternate, implementation-dependent methods known to those skilled in the arts of analytic geometry, vector analysis, or search-engine design of identifying and quantizing relevance of a schema to a query in p-dimensional concept space. Such methods may comprise, but are not limited to identifying relevance as a function a scalar product of a first tensor representing a query Q and a second tensor representing a schema S. Other embodiments may comprise well-known vector methods that may comprise, but are not limited to, trigonometric functions, functional weighting algorithms, root-sum-square methods, or weighted coordinate-comparison functions.

Figure 5:
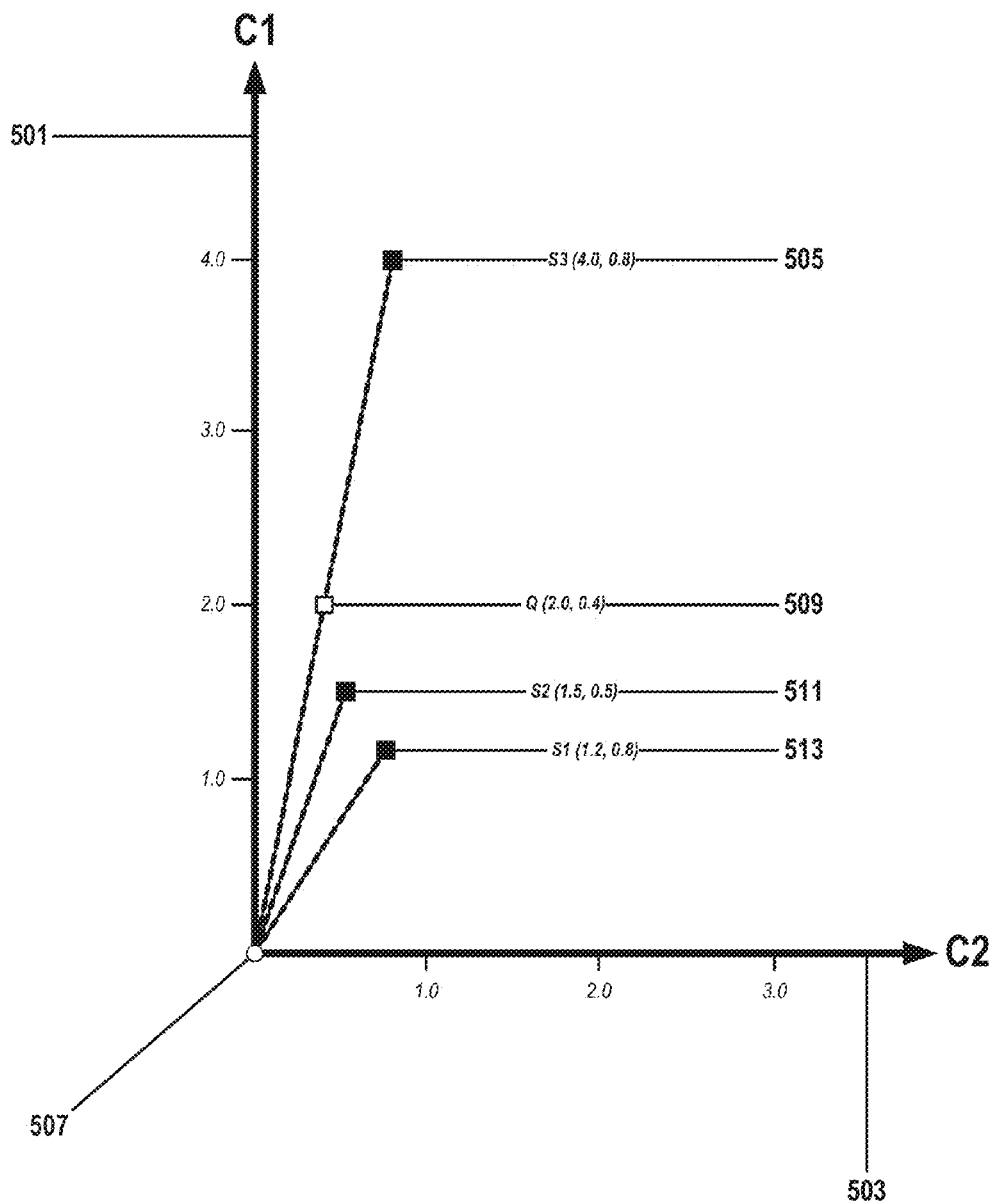
FIG. 5 is a diagram that illustrates a method for identifying a relative relevance of a semantic schema to a conceptual query and by representing the schema and query in a p-dimensional coordinate system, in accordance with embodiments of the present invention.

FIG. 5 and an accompanying description demonstrate how alternate methods may produce different results.

In summary, a concept C comprised by both a query Q and a schema S may be associated with a semantic value within the query Q that is equal to a weight of C in Q.

Concept C may also be associated with a semantic value $SV(C,S)$ within the schema S that is equal to $\Sigma_{i:1...n}[SW(Ci,S)*Str(ch(C,Ci))]$, wherein $\{C1...Cn\}$ is a set of n concepts comprised by schema S. If C is the only concept comprised by Q, a set of semantic values $SV(C,S_i)$ may be used to rank and order a corresponding set of schemas S, retrieved by a search engine in response to the query Q, wherein a schema 51 that associates C with a greater semantic value $SV(C,S1)$ within S1 will have a greater relevance to the query Q than does a schema S2 that associates C with a lesser semantic value $SV(C,S2)$ within S2.

A query Qp that comprises a set of p weighted concepts $CQ=\{C1...Cp\}$ may be represented as a point or a tensor in a p-dimensional coordinate system, wherein a coordinate of Qp on an $i^{th}$ axis of the p-dimensional coordinate system is equal to a weight of a corresponding concept $Ci \in CQ$.

Similarly, a schema S that comprises the same set of p weighted concepts $CQ=\{C1...Cp\}$ may be represented as a point or a tensor in a p-dimensional coordinate system, wherein a coordinate of Sp on an $i^{th}$ axis of the p-dimensional coordinate system is equal to $SV(Ci,S)$, a semantic value within S of a corresponding concept of $Ci \in CQ$.

A semantic value of a query Q of the set CQ within the schema S is denoted $SV(Q,S)$ and may be equal to $\Sigma_{i:1...p}[SV(Ci,S)*wt(Ci,Q)]$, wherein $SV(Ci,S)$ is a semantic value of a concept $Ci \in CQ$ within schema S and $wt(Ci,Q)$ is a weight of the concept Ci within query Q.

Alternatively, a semantic value of the query Q within the schema S may be identified as a p-dimensional distance between a point representing the query Q in the p-dimensional space defined by the concepts comprised by set $CQ=\{C1...Cp\}$ comprised by Q and a point representing the schema S in the p-dimensional space defined by the concepts comprised by the set CQ.

A semantic value of the query Q within the schema S may also be computed as a scalar product between a tensor representing Q in the p-dimensional space defined by the concepts comprised by set CQ and a tensor representing S in the p-dimensional space defined by the concepts comprised by set CQ.

In embodiments of the present invention, these concepts allow a search engine that responds to a query Q by retrieving an answer set of n information-bearing entities and n corresponding retrieved schemas $\{S1...Sn\}$, wherein an $i^{th}$ retrieved entity of the set of n retrieved entities is associated with an $i^{th}$ schema of the set of n corresponding retrieved schemas $\{S1...Sn\}$, to rank and order the n retrieved entities by their relative relevance to the query Q by ranking and ordering the semantic values of the retrieved entities' corresponding schemas.

A schema S that comprises a set of n concepts $\{C1...Cn\}$, wherein each concept $Ci \in \{C1...Cn\}$ may be assigned a semantic value within S denoted $SV(Ci,S)$, may itself be assigned a semantic value $SV(S)$, wherein $SV(S)$ is a function of a sum of n semantic values $SV(Ci,S)$ of the n concepts comprised by S. This semantic value of S may be identified as:

$$SV(S) = \Sigma_{i:1...n}[SV(Ci,S)]$$

Here, $SV(S)$ is a semantic value of the schema S itself, independent of a semantic value of a query or of a relative relevance of the schema to a query. A set of semantic values of a set of schemas may be used to quantify and compare the relative richness of the set of schemas and to use this information to rank the schemas independently of their relationships to particular queries. In some embodiments, a richness of a schema may be a function of a breadth of a range of concepts comprised by the schema, or may be a function of a number of instances of relatively common or relatively useful concepts comprised by the schema.

Embodiments of the present invention described above may function best in environments like the semantic World Wide Web or a semantic database, wherein such environments may comprise conceptual data models and semantic information that may relate keywords and symbols to conceptual meanings FIG. 1 shows a structure of a computer system and computer program code that may be used to implement a method for ranking answers to a conceptual query in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for the efficient selection of runtime rules for programmable search in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for the efficient selection of runtime rules for programmable search.

Any of the components of the present invention could be created, integrated, hosted, maintained, deployed, managed, serviced, supported, etc. by a service provider who offers to facilitate a method for the efficient selection of runtime rules for programmable search. Thus the present invention discloses a process for deploying or integrating computing infrastructure, comprising integrating computer-readable code into the computer system 101, wherein the code in combination with the computer system 101 is capable of performing a method for the efficient selection of runtime rules for programmable search.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

Figure 2:
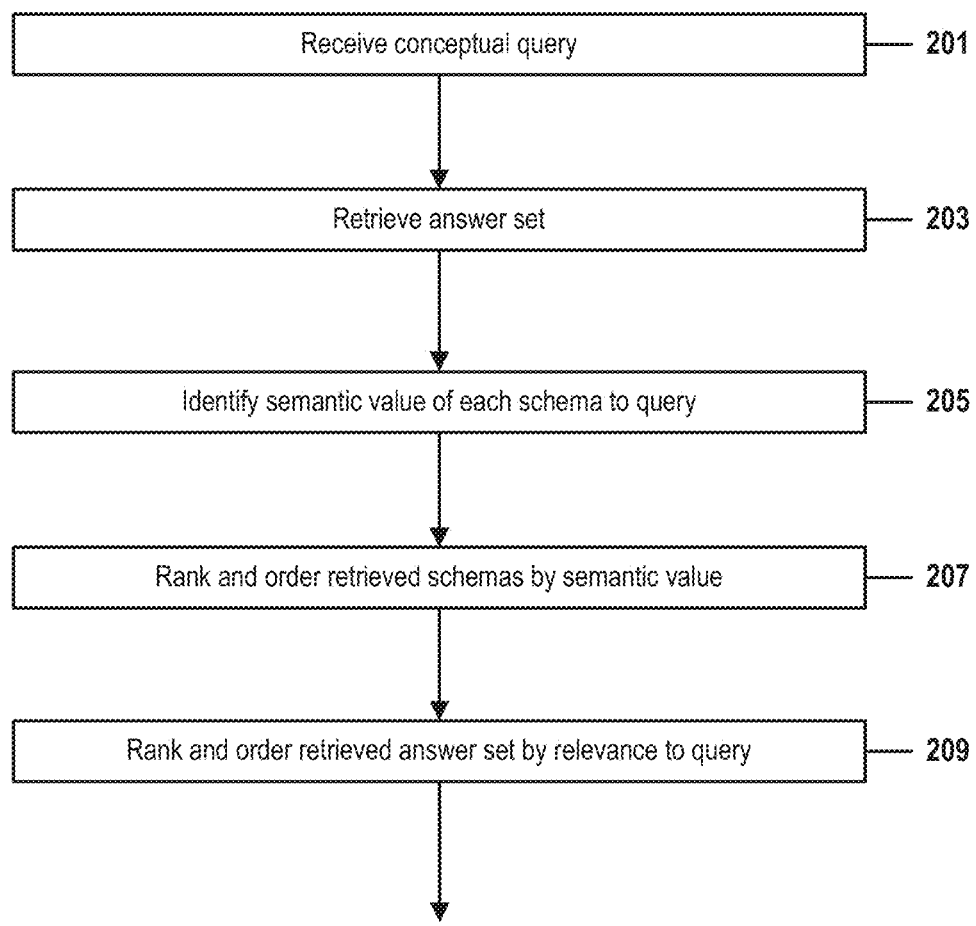
FIG. 2 is a flow chart that overviews a method for ranking answers to a conceptual query in accordance with embodiments of the present invention presented herein.

FIG. 2 is a flow chart that overviews a method for ranking answers to a conceptual query in accordance with embodiments of the present invention presented herein. FIG. 2 comprises steps 201-209.

In step 201, a conceptual search engine receives a conceptual query Q that may comprise a set of queried concepts C(Q). The query Q may be received from querying entity that desires a set of answers that are relevant to the semantic meanings of the queried concepts within the context of the query. In some embodiments, the query will comprise a set of character strings, or keywords, that may be interpreted by the conceptual search engine as concepts or as instances of concepts.

In step 203, the search engine retrieves an answer set of information-bearing entities through a method well-known to those skilled in the field of search-engine design, wherein each retrieved entity may comprise or be relevant to a concept comprised by the query. Each retrieved entity may be associated with a semantic schema that may comprise a subset of the set of queried concepts C(Q) and may be further associated with a set of relationships among the concepts of the subset of the queried concepts. In some embodiments, the retrieved answer set may comprise a set of retrieved semantic schemas, wherein a schema of the set of retrieved semantic schemas is associated with a retrieved information-bearing entity comprised by the answer set. In some embodiments, the method of FIG. 2 may ignore an information-bearing entity comprised by the retrieved answer set if that entity is not associated with a retrieved semantic schema comprised by the retrieved answer set.

Figure 3:
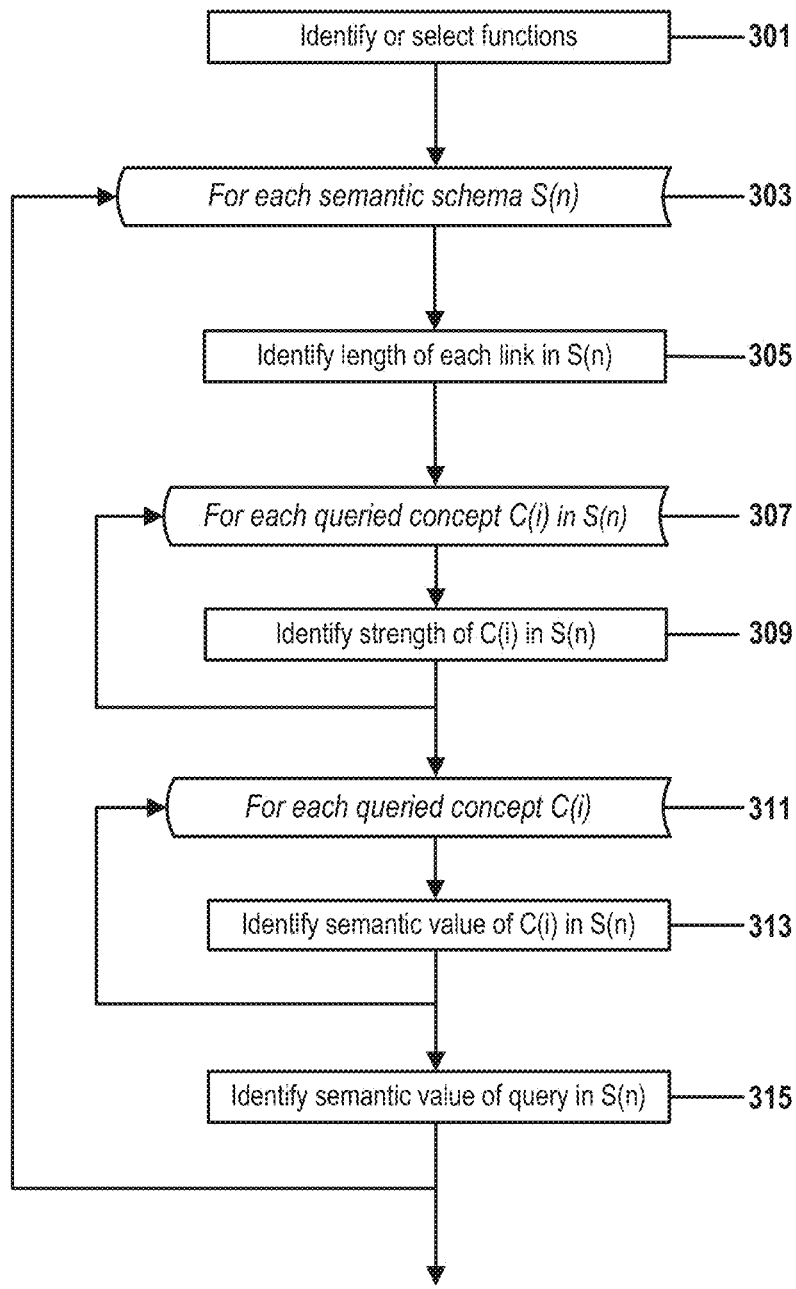
FIG. 3 is a flow chart that presents further details of a procedure of step 205 of FIG. 2, in accordance with embodiments of the present invention described herein, for identifying a semantic value of a semantic schema to a conceptual query.

Step 205 performs the method of FIG. 3 once for each semantic schema in the answer set, wherein said each semantic schema in the answer set may have been retrieved in step 203, and wherein said each semantic schema comprises a queried concept in the set of concepts C(Q). Step 205 and FIG. 3 may identify a semantic value of the conceptual query Q within each such retrieved semantic schema comprised by the answer set.

Step 207 ranks and orders the semantic schemas comprised by the answer set as a function of the schema semantic values identified in step 205, wherein each schema semantic value identifies a semantic value and associates that semantic value with one of the ranked and ordered semantic schemas. In embodiments described herein, this ranking and ordering is performed by sorting the schemas by their associated semantic values in descending order. In other embodiments, this ranking and ordering may be performed by alternative or analogous procedures that are based on functions of these associated semantic values identified in step 205. In some embodiments, a default procedure may associate a default rank and order with an information-bearing entity retrieved by the procedure of step 203, wherein the information-bearing entity is not associated with a retrieved semantic schema.

Step 209 ranks and orders the retrieved information-bearing entities comprised by the answer set by their relative relevance to the conceptual query Q. This ranking and ordering may be performed as a function of the sorted order identified in step 207 of the set of semantic schemas, wherein a relative relevance of a retrieved information-bearing entity is a function of a relative semantic value of a semantic value of a semantic schema associated with the retrieved information-bearing entity.

In embodiments described herein, the retrieved information-bearing entities are thus ordered by their descending relative relevance to the query Q, wherein an entity's relative relevance to the query Q is a function of a relative semantic value of a semantic schema associated with the entity, and wherein the associated semantic schema was retrieved by step 203.

In embodiments described herein, this ordering of step 209 results in a sorted order of information-bearing entities that is analogous to the sorted order of step 207 of the set of schemas associated with the entities. In other embodiments, this ordering of step 209 may be performed by alternative or analogous procedures that are based on functions of the semantic values identified in step 205.

FIG. 3 is a flow chart that presents further details of the procedure of step 205 of FIG. 2, in accordance with embodiments of the present invention described herein, for identifying a semantic value of a semantic schema to a conceptual query. FIG. 3 comprises steps 301-315.

In step 301, embodiments of the present invention may select a set of functions that may comprise components of a method to identify a semantic value of a queried concept in a semantic schema, in accordance with embodiments of the present invention described herein.

In some embodiments, the selection of these functions may be implementation-dependent or may depend upon system requirements or design goals of the conceptual search engine or may depend upon an availability of resources comprised by the conceptual search engine or comprised by a platform upon which the conceptual search engine runs.

In some embodiments, these functions may be selected from a knowledge base or may be selected as a function of a characteristic of a conceptual query, of a characteristic of a concept comprised by a conceptual query, of a characteristic of an information-bearing entity identified or retrieved by a search engine in response to a conceptual query, of a characteristic of a semantic schema retrieved in response to a conceptual query, as described in step 203, or of some combination thereof. In some embodiments, these functions may be expressly or implicitly identified by a querying entity or search-engine user or may be a function of some express or implicit designation of a querying entity or of a search-engine user.

A subset of a set of functions selected by step 301, wherein said subset may be used to identify a semantic value of a conceptual query Q in a semantic schema S, may be denoted by nomenclature of the form SV(Q,S), which denotes a semantic value of a query Q in a schema S.

A function SV(Q,S) may comprise a function SV(C(i),S), which denotes a semantic value of a concept C(i) within a schema S, wherein conceptual query Q may comprise an n-element set of queried concepts C(Q)={C(1) ... C(n)}, and wherein C(Q) in turn comprises concept C(i).

Selection of a function SV(Q,S) may be implementation-dependent or embodiment-dependent and SV(Q,S) may be any function of conceptual query Q and semantic schema S that meets criteria described herein. In some embodiments, a function SV(Q,S) may be well-known to persons skilled in the art of search-engine design.

Examples of SV(Q,S) functions include, but are not limited to:

i) functions of a form:

$$SV(Q,S) = \Sigma_{i:1 \ldots m}[SV(C(i),S) * wt(C(i),Q)]$$

wherein a conceptual query Q comprises a set of m concepts C(Q) and wherein wt(C(i),Q) is a weight of a concept C(i) in C(Q). As is described herein and in the description of FIG. 5, a concept may be associated with a weight in order to ensure that its relative importance to a conceptual query is accurately represented;

ii) functions of a distance in a p-dimensional coordinate system between a point in the p-dimensional space representing a conceptual query Q and a point in the p-dimensional space representing a schema S, wherein an $i^{th}$ axis of the p-dimensional coordinate system is calibrated in units of a concept C(i) of a set of concepts C(Q) comprised by the query Q, wherein a coordinate of the query Q on the $i^{th}$ axis equals wt(C(i),Q), a weight of the concept C(i) of the set of concepts C(Q), and wherein a coordinate of the schema S on the $i^{th}$ axis equals SV(C(i),S), a semantic value of the concept C(i) in the schema S; or iii) functions of a scalar product of a tensor representing a query Q in a p-dimensional coordinate system and a tensor representing a schema S in the p-dimensional coordinate system, wherein an $i^{th}$ axis of the p-dimensional coordinate system is calibrated in units of a concept C(i) of a set of concepts C(Q) comprised by the query Q, wherein a coordinate of the query Q on the $i^{th}$ axis equals wt(C(i),Q), a weight of the concept C(i) of the set of concepts C(Q), and wherein a coordinate of the schema S on the $i^{th}$ axis equals SV(C(i),S), a semantic value of the concept C(i) in the schema S.

In some embodiments, other types of semantic value functions may be selected in step 301 that may identify a semantic value of an other type of entity in an other context. Said other type of entity might comprise, but not be limited to, a query or a schema. Said other type of context might comprise, but not be limited to, a schema.

Another subset of the set of functions selected by step 301 may comprise one or more length functions, which may include, but are not limited to, a L(ch) function that identifies a length of a chain ch, and a L(lnk) function that identifies a length of a link lnk.

Examples of length functions may comprise, but are not limited to:

i) a default function that identifies a length of a link as a default length of 1, or as some other constant value;

ii) a length function with the same characteristics as i), that identifies that every concept is by default linked to itself with a link which default length equals to 0, null or other void;

iii) a length function that identifies a link length that is greater than or less than a default value, based on relative values of one or more characteristics of the link length, of a semantic schema that comprises the link, or of concepts related by the link in the semantic schema;

iv) a length function with the same characteristics as ii), that specifically identifies a length of a link as equal to 0, null or other void between two concepts that are considered as equivalent.

Yet another subset of the set of functions selected by step 301 may comprise one or more strength functions, which may include, but are not limited to, a Str(C) function that identifies a strength of a concept C, a Str(C,S) function that identifies a strength of a concept C within a schema S, a Str(lnk,S) function that identifies a strength of a link lnk within a schema S, a Str(ch, S) function that identifies a strength of a chain ch within a schema S, a liaison strength LStr(C(i),C(j), S) function that identifies a strength of a liaison between concept C(i) and concept C(j) within schema S when there is more than one chain or link in S between C(i) and C(j), and a Str(C,Q) function that identifies a strength of a concept C within a conceptual query Q. In some embodiments, other types of strength functions may be selected in step 301 that may identify a strength of an other type of entity in an other context.

Examples of strength functions may comprise, but are not limited to:

i) a default concept-strength function that assigns a default strength of 1 (or some other constant) to a concept;

ii) a link-strength function that identifies a strength of a link an inverse function of a length of the link. One example of such a function that returns a finite strength value for a zero-length link is: Str(lnk)=1/(1+L(lnk)); or iii) a chain-strength function that identifies a strength of a chain as an inverse function of a length of the chain. An example of such a function that returns a finite strength value for a zero-length chain is: Str(ch)=1/(1+L(ch)), wherein L(ch), the length of chain ch, equals a sum of the lengths of all links that are comprised by the chain;

iv) a liaison-strength function LStr(C(x),C(y),S) that identifies a maximum strength of a chain between a concept C(x) within a semantic schema S and a concept C(y) in the semantic schema S, wherein C(x) and C(y) may be connected by more than one path in S or by more than one chain in S. A simple example of such a function is one that returns a value of a strength of a chain between C(x) and C(y) that is greater than or equal to a value of a strength of any other chain between C(x) and C(y)—in other words, a function that returns a strength value of a "strongest" chain between C(x) and C(y); or v) a strength assignment that identifies a strength that is greater than or less than a default value or of an other calculated value, based on a set of relative values of one or more characteristics of a concept, link, chain, or other entity.

Figure 4:
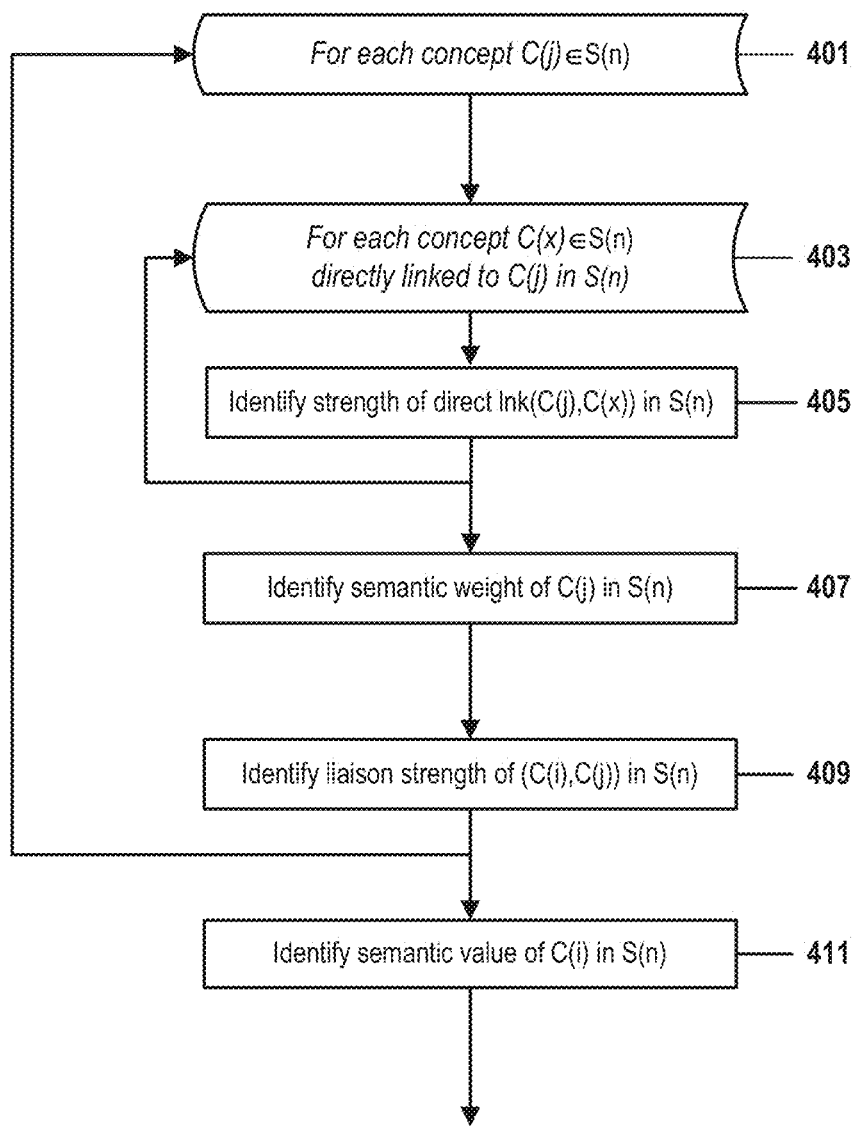
FIG. 4 is a flow chart that illustrates details of a procedure of step 313 of FIG. 3 for identifying a semantic value of a queried concept within a semantic schema in accordance with embodiments of the present invention.

Other subsets of the set of functions selected by step 301 may comprise semantic weight functions, as described in FIG. 4, or other types of functions that may be required by embodiments of the present invention in order to identify or compute semantic values, and examples of which may be described herein.

Step 303 initiates an iterative procedure that comprises steps 303-315 and that performs one iteration for each semantic schema S(n) of the answer set of semantic schemas retrieved in step 203. Upon completion of this iterative procedure for all such semantic schemas in the answer set, the method of FIG. 3 terminates and embodiments of the present invention continue with step 207 of FIG. 2.

Step 305 employs one or more length functions selected in step 301 to identify a length of each link of a set of all links comprised by the schema S(n), wherein said each link identifies a relationship between a pair of concepts comprised by the schema S(n). In some embodiments, step 305 may not identify a length of a link that identifies a relationship between a pair of concepts if either concept of the pair of concepts is not comprised by query Q.

Step 307 initiates an iterative procedure that comprises steps 307-309 and that may perform one iteration for each concept C(j) comprised by schema S(n). In some embodiments, an iteration of steps 307-309 may not be performed for a concept that is not comprised by query Q. Upon completion of the iterative procedure of steps 307-309 for all concepts C(j) that meet one of these sets of criteria, or that meet analogous, implementation-dependent, sets of criteria, the iterative procedure of steps 307-309 terminates and the method of FIG. 3 continues with step 311.

Step 309 employs one or more strength functions selected in step 301 to identify Str(C(j),S(n)), a strength of the concept C(j) in the schema S(n). Upon completion of the iterative procedure of steps 307-309 for all concepts C(j) in S(n) that meet the set of criteria identified by step 307, the method of the present invention will have identified a strength Str(C(j), S(n)) for every such concept C(j), the iterative procedure of steps 307-309 will terminate, and the method of FIG. 3 will continue with step 311.

Step 311 initiates an iterative procedure that comprises steps 311-313 and that may perform one iteration for each queried concept C(i)∈C(Q), wherein the conceptual query Q of step 201 comprises the set of queried concepts C(Q). In some embodiments, an iteration of steps 311-313 may be performed for a queried concept C(i) only if C(i) is comprised by both C(Q) and by semantic schema S(n). Upon completion of the iterative procedure of steps 311-313 for all queried concepts C(i) that meet one of these sets of criteria, or that meet analogous, implementation-dependent, sets of criteria, the iterative procedure of steps 311-313 terminates and the method of FIG. 3 continues with step 315.

Step 313 employs one or more semantic value functions selected in step 301 to identify SV(C(i),S(n)), a semantic value of the queried concept C(i) in the schema S(n). In some embodiments, SV(C(i),S(n)) may return a null or other void or constant value if S(n) does not comprise C(i).

Step 313 is described in greater detail in FIG. 4.

Upon completion of the iterative procedure of steps 311-313 for all queried concepts C(i) that meet a set of criteria identified by step 311, the method of FIG. 3 will have identified a semantic value SV(C(i),S(n)) for every such concept C(i), the iterative procedure of steps 311-313 will terminate, and the method of FIG. 3 will continue with step 315.

Step 315 identifies a value of SV(Q,S(n)), a semantic value of the conceptual query Q of step 201 within schema S(n). A selection of a semantic value function in step 301 may depend upon implementation details of a particular embodiment of the present invention, but a selected semantic value function must comprise a function of a set of semantic values of the form SV(C(i),S(n)) returned by the iterative procedure of steps 311-313, wherein each semantic value SV(C(i),S(n)) is a semantic value of a queried concept C(i) within schema S(n).

If, for example, an embodiment of the present invention implements step 315 through a function SV(Q,S) selected in step 301 as a first example of a semantic-value function, then the semantic value of conceptual query Q within schema S(n) would be:

$$SV(Q,S(n)) = \Sigma_{i:1 \ldots m}[SV(C(i),S(n))*wt(C(i),Q)]$$

wherein the query Q comprises a set of m concepts C(Q)={C(1) ... C(m)}, wt(C(i),Q) is a weight of a queried concept C(i)∈C(Q), and SV(C(i),S(n)) is a semantic value of a concept C(i)∈C(Q) within schema S(n). In this example, a semantic value of a query Q within a schema S(n) equals the sum of a set of products, wherein each product of said set of products comprises a semantic value of a concept C(i) within S(n) multiplied by a weight of the concept C(i) within Q. As described in step 301, other embodiments may comprise different semantic-value functions to represent a relative importance or weighting of concepts in the schema and query.

At the completion of step 315, if the iterative procedure of steps 303-315 has not been performed for all semantic schema S(n), the method of FIG. 3 will return to step 303 to begin the next iteration of the iterative procedure of step 303-315 for a next semantic schema S(n). If the iterative procedure of steps 303-315 has been performed for all semantic schema S(n), the method of the present invention will continue with step 207 of FIG. 2, returning a semantic value of query Q within each schema S(n) retrieved by step 203.

FIG. 4 is a flow chart that illustrates details of a procedure of step 313 of FIG. 3 for identifying a semantic value of a queried concept C(i) within a semantic schema S(n), wherein C(i) is comprised by a set of queried concepts C(Q) that is in turn comprised by a conceptual query Q, and wherein, in response to the query Q, S(n) is retrieved by a search engine in step 203. In some embodiments, the method of FIG. 4 may be performed once for each queried concept C(i) comprised by the query Q. In other embodiments, the method of FIG. 4 may be performed once for each queried concept C(i) that is comprised by both C(Q) and by the semantic schema S(n). FIG. 4 comprises steps 401-411.

Step 401 initiates an iterative procedure that comprises steps 401-409 and that is performed for each concept C(j) that is comprised by schema S(n). Upon completion of this iterative procedure for all such concepts C(j), the iterative procedure of steps 401-409 terminates and the method of FIG. 4 continues with step 411.

Step 403 initiates an iterative process that comprises steps 403-405 and that is performed once for each concept C(x) that is comprised by schema S(n), wherein C(x) is connected by a single direct link to the concept C(j). In some embodiments, concept C(j) may be deemed to be connected to itself by a single direct link. In some embodiments, such a single direct link to itself may be deemed to have a default length equal to 0, to a null value, or to some other void value. Upon completion of this iterative process of steps 403-405 for all concepts C(x), the iterative process of steps 403-405 terminates and the method of FIG. 4 continues with step 407.

Step 405 identifies Str(lnk(C(j),C(x)),S(n)), a strength of a direct link lnk(C(j),C(x)) within schema S(n), wherein the direct link lnk(C(j),C(x)) directly connects concept C(j) within schema S(n) to concept C(x) within schema S(n). In some embodiments, concept C(j) may be deemed to be connected to itself by a single direct link lnk, and such a link may be deemed to have a default length equal to 0, to a null value, or to some other void value.

As further explained in the description of step 301, such a strength of a link lnk(C(j),C(x)) may be identified by a link-strength function Str(lnk). In embodiments described herein, a strength of a link lnk Str(lnk) might be an inverse function of L(lnk), a length of the link lnk. In one example, a strength of a link lnk might be identified by a function:

$$Str(lnk) = 1/(1+L(lnk)).$$

In embodiments wherein a concept C(j) is not distinct from a concept C(x) in step 405, C(j) may have a direct link to itself, wherein the direct link to itself may be deemed to have a default length of zero, a null value, or some other void value.

In such embodiments, a strength of the direct link lnk between concept C(j) and concept C(x) might be:

$$Str(lnk)=1/(1+L(lnk))=1/(1+0)=1.$$

The selection of a strength function to be applied in step 405 may be implementation-dependent, and the selection of which function to use in a particular embodiment of the present invention is made in step 301. The description of step 301 also offers examples of chain-length, link-length, and link-strength functions that may comprise a chain-strength or liaison-strength function. Some or all of these functions may be implementation-dependent or embodiment-dependent, but examples of each type of function are well-known to those skilled in the art of search-engine design.

Upon completion of step 405, the iterative process of steps 403-405 begins its next iteration for the next instance of concept C(x). Upon completion of the iterative process of steps 403-405 for all concepts C(x) directly linked in schema S(n) to concept C(j), the iterative process of steps 403-405 terminates and the method of FIG. 4 continues with step 407.

Step 407 uses the results of steps 405 and 309 to identify a semantic weight of the concept C(j) in the schema S(n). An identification of a semantic weight function to be used in step 407 may be implementation-dependent, and an identification of which semantic weight function to use in a particular embodiment of the present invention may be made in step 301.

In the embodiment of FIG. 4, for example, a semantic weight function SW(C(j),S(n)) may be defined as a sum of products, wherein each product is calculated by multiplying a strength of concept C(j) by a strength of a link between concept C(j) in S(n) and a concept C(x) in S(n):

$$SW(C(j),S(n))=Str(C(j))*\Sigma_{x:1\ldots m}Str(lnk(C(j),C(x),S(n))$$

wherein Str(C(j)) is a strength of concept C(j) and Str(C(j),C(x),S(n)) is a strength of a direct link between C(j) within schema S(n) and C(x) within S(n).

Step 409 identifies an LStr(C(i), C(j), S(n)), a liaison strength between C(i) and C(j) within schema S(n), wherein C(i) is a concept in S(n) identified in steps 311-313 of FIG. 3, and C(j) is a concept in S(n) identified in step 401 of FIG. 4.

As explained in the description of step 301, in embodiments wherein multiple chains within a schema S(n) connect a concept C(i) in S(n) to a concept C(j) in S(n) along different paths, a "liaison strength" between C(i) and C(j) may be identified as a strength of a "strongest" chain between C(i) and C(j) in S(n), wherein the strongest chain between C(i) and C(j) in S(n) is a chain that is associated with a strength value that is no less than a strength value associated with any other chain that connects C(i) and C(j) in S(n). In other embodiments of the present invention, step 409 may apply other functions to identify a chain strength, a liaison strength, or a strongest chain between C(i) and C(j) in S(n) when C(i) and C(j) are connected by multiple chains or paths.

In some embodiments, a concept C(i) may be associated with a default direct link to itself, wherein a default length of the default direct link is equal to 0, to a null value, or to a void value. In such embodiments, a strength of a liaison between the concept C(i) and itself may be identified as:

$$LStr(C(i),C(i),S(n))=1/(1+L((C(i),C(i)))=1/(1+0)=1.$$

Upon completion of step 409, the next iteration of the iterative process of steps 401-409 begins with step 401, for the next instance of concept C(j) within S(n). Upon completion of the iterative process of steps 401-409 for all concepts C(j) within S(n), the iterative process of steps 401-409 concludes and the method of FIG. 4 continues with step 411.

Step 411 uses the results of steps 407 and 409 to identify a semantic value of queried concept C(i) within semantic schema S(n). Step 411 may be performed through application of one or more semantic value functions that identify a semantic value of a concept within a schema, and wherein the one or more semantic value functions may be functions of values of SW(C(j),S(n)) identified in step 407, wherein an instance of SW(C(j),S(n)) may identify a semantic weight within S(n) of a concept C(j)∈S(n), and may be further functions of LStr(C(j),C(x),S(n)) identified in step 409, wherein an instance of LStr(C(i),C(j),S(n)) may identify a strength of a liaison between the queried concept C(i) in S(n) and a concept C(j) in S(n). In other embodiments, step 411 may be performed by application of one or more other functions or methods, which may comprise, but are not limited to, functions or examples described in step 301.

When a schema S(n) comprises m concepts {C(1) ... C(m)}, such a semantic value function may be of the form:

$$SV(C(i),S(n))=\Sigma_{j:1\ldots m}[SW(C(j),S(n))*LStr(C(i),C(j),S(n))]$$

In this example, a semantic value of concept C(i) within schema S(n) is a sum of products, wherein each product is the result of multiplying a semantic weight of a concept C(j) in S(n) by a strength of a liaison between the concept C(i) and the concept C(j)∈S(n). The semantic value in this example is thus a sum of such products for all m concepts C(j) in S(n). In other embodiments, other semantic value functions may be identified in step 301 and applied in step 407.

In some embodiments, a concept C(i) may be associated with a default direct link to itself, wherein a default length of the default direct link is equal to 0, to a null value, or to a void value. In such embodiments, a strength of a liaison between the concept C(i) and itself may be identified as:

$$LStr(C(i),C(i),S(n))=1/(1+L((C(i),C(i)))=1/(1+0)=1.$$

In such embodiments, the concept C(i) contributes to its own semantic value, and the semantic weight SW(Ci,S(n)) of C(i) within S(n) contributes to SV(C(i),S(n)), the semantic value of C(i) in S(n).

In some embodiments, if a concept C(k) in a schema S(n) and a concept C(l) in the schema S(n) are considered equivalent within S(n), a length of a link or a chain between C(k) in S(n) and C(l) in S(n) may be associated with a default length equal to 0, to a null value, or to a void value. In such embodiments, a strength of a link lnk in S(n) between C(k) and C(l) may be equal to:

$$Str(lnk,S(n))=1/(1+0)=1,$$

and a strength of a liaison in S(n) between C(k) and C(l) may be equal to:

$$LStr(C(k),C(l),S(n))=1/(1+0)=1$$

In some embodiments, these two characteristics may be combined, such that:

i) a concept C(k) in S(n) may be associated with a default link within S(n) to itself, wherein a default length of the default link to itself is equal to 0, to a null value, or to a void value; and ii) a concept C(k) in S(n) and an equivalent concept C(l) in S(n) may be associated with a default link within S(n) between C(k) and C(l), wherein a default length of the default link between C(k) and C(l) is equal to 0, to a null value, or to a void value.

In such embodiments, if the two equivalent concepts C(k) in S(n) and C(l) in S(n), wherein C(k) and C(l) are linked in S(n) by a link or chain of length equal to 0, to a null value, or to another void value, then C(k) and C(1) have identical semantic values within S(n) equal to:

$$SV(C(k),S(n))=SV(C(1),S(n))$$

Upon completion of step 411, the method of FIG. 4 concludes and embodiments of the present invention continue with the next iteration of the iterative procedure of steps 311 and 313 of FIG. 3. If the iterative procedure of steps 311 and 313 has been performed for all queried concepts C(i), as defined in the description of steps 311-313, then embodiments of the present invention continue with step 315 of FIG. 3.

FIG. 5 is a diagram that illustrates a method for identifying a relative relevance of a semantic schema to a conceptual query and by representing the schema and query in a p-dimensional coordinate system, in accordance with embodiments of the present invention. FIG. 5 comprises reference numerals 501-513.

In this example, a conceptual search engine responds to a conceptual query Q received in step 201 by retrieving in step 203 three semantic schemas S1, S2, and S3, wherein query Q and the three schemas each comprise two weighted concepts C1 and C2. In other examples, a conceptual query may comprise a different number of queried concepts and a semantic schema may comprise a different subset of a set of queried concepts.

FIG. 5 illustrates how a conceptual query and a set of semantic schemas retrieved by a conceptual search-engine in response to a conceptual query may be represented as p-tuples in p-dimensional space (or "p-space"), wherein p is the number of concepts comprised by the query and, in some embodiments, may be comprised by all the retrieved semantic schemas. In this simple two-dimensional example, p is equal to two because query Q comprises two concepts C1 and C2. These all three schemas S1, S2, and S3 comprise both queried concepts, but, in other examples, a semantic schema might be retrieved in response to query Q even if that schema does not comprise both C1 and C2. In this two-dimensional concept space, a vertical axis 501 is calibrated in units of weight or semantic value of concept C1 and a horizontal axis 503 is calibrated in units of weight or semantic value of concept C2.

In FIG. 5, the query Q and the schemas S1, S2, and S3 are thus each represented in two-dimensional concept space as a point described by an ordered pair of coordinates. Each of these points may also be equivalently represented as a vector (or, in higher-dimensional coordinate systems, as a tensor) from the origin 507 of the two-dimensional coordinate system to said point. In this example, Query Q is represented by a point 509 at coordinates (C1=2.0, C2=0.4), meaning that C1 has a weight of 2.0 in Q, and C2 has a weight of 0.4 in Q;

Schema S1 is represented by a point 513 at coordinates (C1=1.2, C2=0.8), meaning that C1 has a semantic value of 1.2 in S1 and C2 has a semantic value of 0.8 in S1;

Schema S2 is represented by a point 511 at coordinates (C1=1.5, C2=0.5)), meaning that C1 has a semantic value of 1.5 in S2 and C2 has a semantic value of 0.5 in S2; and Schema S3 is represented by a point 505 at coordinates (C1=4.0, C2=0.8), meaning that C1 has a semantic value of 4.0 in S3 and C2 has a semantic value of 0.8 in S3.

In this example, concepts C1 and C2 are each assigned a weighting, wherein a weight of a concept may be a function of the concept's relative importance to the query Q. Here, C1 is associated with a weight of 2.0 and C2, which is deemed to be 40% as important to the query Q as is C1, is associated with a weight of 0.80. In other embodiments and in other examples of this embodiment, different methods of selecting values of weightings may be employed and different meanings may be implied by the value of each weighting. The ratio between two relative importances of two concepts might, for example, be a nontrivial function of a ratio between a pair of weightings each associated with one of those two concepts.

In one embodiment of the present method of determining a relative relevance of a semantic schema to a conceptual query, wherein the schema and the query are each represented as a point in p-space, the method may identify a relative relevance of the schema as a function of a distance in p-space between a first point representing the schema and a second point representing the query.

In FIG. 5, for example, points representing schema S1 513 and schema S2 511 are each relatively closer to a point representing query Q 509, in comparison to the relatively large distance between a point representing S3 505 and the point representing query Q 509. A method that identifies relevance as an inverse function of p-space distance between a query and a schema may thus identify a relevance of S3 505 to Q 509 that is lower than a relevance of either S1 513 or S2 511 to Q 509 because the coordinate representing S3 505 lies at a greater distance in two-dimensional space from the coordinate representing Q 509 than does either the coordinate representing S1 513 or the coordinate representing S2 511.

In this example, a method that identifies relevance or semantic value of retrieved schema as a function of a distance between points in a p-space may produce more accurate results by first normalizing vectors or tensors that represent the retrieved schema. Failing to do so in such an embodiment may result in associating an erroneously low relative relevance to a retrieved answer that lies too far from a query point Q, even if the retrieved answer is associated with an otherwise-high semantic value for a queried concept. Such normalization methods may comprise a function that transforms a length of each vector or tensor of a set of retrieved vectors or tensors that each represents a retrieved answer of a retrieved answer set by dividing a length of the each vector or tensor by a length of a longest vector or tensor of the retrieved answer set. Other embodiments may comprise different normalization methods that are well-known to those skilled in the art of trigonometry.

Another embodiment, however, may employ a second method that identifies a relative relevance of a semantic schema to a query in p-space as a function of a scalar product of a first tensor or vector from an origin point 507 of the p-dimensional coordinate system to a coordinate representing the schema and a second tensor or vector from the origin point 507 to a coordinate representing the query.

Using matrix computations well-known to those skilled in the field of linear algebra or linear programming, this second method may in FIG. 5 identify a scalar product of a vector from origin 507 to S3 505 and a vector from origin 507 to Q 509 as greater than a scalar product of a vector from origin 507 to S1 513 and a vector from origin 507 to Q 509 and, similarly, as greater than a scalar product of a vector from origin 507 to S2 511 and a vector from origin 507 to Q 509.

The scalar product of the vector from origin 507 to S3 505 and the vector from origin 507 to Q 509 has the greatest magnitude of these three scalar products because the two vectors that comprise this scalar product have the same slope and origin point in two-dimensional space, and because the length of the vector from origin 507 to coordinate S3 505 in greater than the length of either the vector from origin 507 to point S1 513 or the vector from origin 507 to point S2 511.

These conclusions are easily derived through application of common vector operations well-known to those skilled in the art of linear algebra.

This second method therefore identifies semantic schema S3 505 as having greater relevance to query Q 509 because the scalar product of the vector from the origin 507 to Q 509 and the vector from the origin to S3 is greater than either of the previously described scalar products associated with vectors connecting origin 508 to, respectively, S1 513 and S2 511.

A third method, described above in the discussion of step 315, may identify a semantic value of query Q in a schema S as a function of the semantic value of each queried concept within the schema S and of the semantic weight of each concept within the query Q:

$$SV(Q,S) = \Sigma_{i:1\ldots m}[SV(C(i),S) * wt(C(i),Q)],$$

providing the following results:

$$SV(Q,S1) = (1.2*2.0) + (0.8*0.4) = 2.4 + 0.32 = 2.72$$

$$SV(Q,S2) = (1.5*2.0) + (0.5*0.4) = 3.0 + 0.2 = 3.2$$

$$SV(Q,S1) = (4.0*2.0) + (0.8*0.4) = 8 + 0.32 = 8.32$$

These three examples and FIG. 5 illustrate three mathematical approaches that correspond to three classes of embodiments of the present invention, and that may be used in accordance with embodiments of the present invention to identify and rank relative relevances of schemas to a query. In other embodiments, other multidimensional or graphical mathematical functions and techniques well-known to those skilled in fields such as linear algebra or linear programming may be substituted to identify and rank schemas by relevance, based on implementation-dependent details of a particular embodiment of the present invention.

What is claimed is:

1. A method for ordering answers to a search-engine query, the method comprising:
    a processor of a computer system receiving the search-engine query, wherein the query comprises a set of queried concepts of a general set of concepts;
    the processor receiving a set of semantic schemas,
        wherein the set of semantic schemas comprises a received subset of concepts of the set of queried concepts and further comprises a plurality of relationships,
        wherein a relationship of the plurality of relationships relates two or more concepts of the general set of concepts,
        wherein a first schema of the set of semantic schemas comprises a first subset of concepts of the received subset of concepts, a second concept of the general set of concepts, a third concept of the general set of concepts, and a first set of relationships of the plurality of relationships,
        wherein a first chain relationship of the plurality of relationships relates the first concept to the second concept, wherein the first chain relationship comprises a first set of link relationships of the plurality of relationships, wherein the first set of link relationships is associated with a first set of link-relationship lengths of a plurality of relationship lengths, wherein a first link relationship of the first set of link relationships is associated with a first link-relationship length of the first set of link-relationship lengths, and wherein a first chain-relationship strength of the plurality of relationship strengths is an inverse function of the first set of link-relationship lengths,
        wherein the first subset of concepts comprises a first concept of the received subset of concepts,
        wherein a first relationship of the first set of relationships relates the first concept to the second concept,
        wherein the first relationship is associated with a subset of liaison strengths of a plurality of relationship strengths,
        wherein the first concept is associated with a first concept weight within the search-engine query of a set of concept weights,
        wherein the second concept is associated with a second concept strength of a set of concept strengths, and
        wherein the second concept is associated with a second semantic weight in the first schema of a set of semantic weights;
    the processor determining a first semantic value of the first schema to the query as a function of the first subset of concepts and as a further function of the first set of relationships;
    the processor identifying a first relative relevance of the first schema to the query as a function of the first semantic value of the first schema to the query,
        wherein said identifying a first semantic value of the first schema to the query is a further function of a first set of concept semantic values within the first schema of a plurality of sets of concept semantic values, and wherein the first concept is associated with a first concept semantic value in the first schema of the first set of concept semantic values, and
        wherein said first concept semantic value in the first schema is a function of the subset of liaison strengths and is a further function of the second semantic weight in the first schema, wherein the second semantic weight is a function of the second concept strength, wherein the second semantic weight is a further function of a set of second-concept relationship strengths of the plurality of relationship strengths, and wherein a relationship strength of the set of second-concept strengths is associated with a relationship between the second concept and the third concept; and
    the processor ordering the first schema among the set of semantic schemas as a function of the first relative relevance.

2. The method of claim 1, wherein the determining the first semantic value is a further function of a first set of relationship strengths within the first schema of the plurality of relationship strengths.

3. The method of claim 1, wherein the first concept semantic value in the first schema is a function of only one liaison strength of the subset of liaison strengths, and wherein the one liaison strength is the greatest liaison strength of the subset of liaison strengths.

4. The method of claim 1, wherein a relationship of the plurality of relationships that relates a pair of equivalent concepts of the general set of concepts is associated with a zero-length or null relationship length of the plurality of relationship lengths.

5. The method of claim 1, wherein the identifying a first relative relevance of the first schema comprises the steps of:
    the processor plotting the search-engine query as a first point in a p-dimensional coordinate system and further plotting the first schema as a second point in the p-dimensional coordinate system, wherein an axis of the p-dimensional coordinate system is associated with a concept of the set of queried concepts;

the processor generating a first p-dimensional tensor from an origin of the p-dimensional coordinate system to the first point;

the processor generating a second p-dimensional tensor from an origin of the p-dimensional coordinate system to the second point; and the processor identifying the first relative relevance of the first schema as a function of a parameter selected from the group comprising: a p-dimensional distance between the first point and the second point, a product of the first concept semantic value and the first concept weight within the search-engine query, and a scalar product of the first p-dimensional tensor and the second p-dimensional tensor, wherein the first concept semantic value is associated with the first concept.

6. The method of claim 1, further comprising providing at least one support service for at least one of creating, integrating, hosting, maintaining, and deploying computer-readable program code in the computer system, wherein the computer-readable program code in combination with the computer system is configured to implement the receiving, determining, identifying, and ordering.

7. A computer program product, comprising a computer-readable hardware storage device having a computer-readable program code stored therein, the program code configured to be executed by a processor of a computer system to implement a method for ordering answers to a search-engine query, the method comprising:

the processor receiving the search-engine query, wherein the query comprises a set of queried concepts of a general set of concepts;

the processor receiving a set of semantic schemas,
wherein the set of semantic schemas comprises a received subset of concepts of the set of queried concepts and further comprises a plurality of relationships,
wherein a relationship of the plurality of relationships relates two or more concepts of the general set of concepts,
wherein a first schema of the set of semantic schemas comprises a first subset of concepts of the received subset of concepts, a second concept of the general set of concepts, a third concept of the general set of concepts, and a first set of relationships of the plurality of relationships,
wherein a first chain relationship of the plurality of relationships relates the first concept to the second concept, wherein the first chain relationship comprises a first set of link relationships of the plurality of relationships, wherein the first set of link relationships is associated with a first set of link-relationship lengths of a plurality of relationship lengths, wherein a first link relationship of the first set of link relationships is associated with a first link-relationship length of the first set of link-relationship lengths, and wherein a first chain-relationship strength of the plurality of relationship strengths is an inverse function of the first set of link-relationship lengths,
wherein the first subset of concepts comprises a first concept of the received subset of concepts,
wherein a first relationship of the first set of relationships relates the first concept to the second concept,
wherein the first relationship is associated with a subset of liaison strengths of a plurality of relationship strengths,
wherein the first concept is associated with a first concept weight within the search-engine query of a set of concept weights,
wherein the second concept is associated with a second concept strength of a set of concept strengths, and
wherein the second concept is associated with a second semantic weight in the first schema of a set of semantic weights;

the processor determining a first semantic value of the first schema to the query as a function of the first subset of concepts and as a further function of the first set of relationships;

the processor identifying a first relative relevance of the first schema to the query as a function of the first semantic value of the first schema to the query,
wherein said identifying a first semantic value of the first schema to the query is a further function of a first set of concept semantic values within the first schema of a plurality of sets of concept semantic values, and
wherein the first concept is associated with a first concept semantic value in the first schema of the first set of concept semantic values, and
wherein said first concept semantic value in the first schema is a function of the subset of liaison strengths and is a further function of the second semantic weight in the first schema, wherein the second semantic weight is a function of the second concept strength, wherein the second semantic weight is a further function of a set of second-concept relationship strengths of the plurality of relationship strengths, and wherein a relationship strength of the set of second-concept strengths is associated with a relationship between the second concept and the third concept; and the processor ordering the first schema among the set of semantic schemas as a function of the first relative relevance.

8. The computer program product of claim 7, wherein the determining the first semantic value is a further function of a first set of relationship strengths within the first schema of the plurality of relationship strengths.

9. The computer program product of claim 7, wherein the first concept semantic value in the first schema is a function of only one liaison strength of the subset of liaison strengths, and wherein the one liaison strength is the greatest liaison strength of the subset of liaison strengths.

10. The computer program product of claim 7, wherein a relationship of the plurality of relationships that relates a pair of equivalent concepts of the general set of concepts is associated with a zero-length or null relationship length of the plurality of relationship lengths.

11. The computer program product of claim 7, wherein the identifying a first relative relevance of the first schema comprises the steps of:

the processor plotting the search-engine query as a first point in a p-dimensional coordinate system and further plotting the first schema as a second point in the p-dimensional coordinate system, wherein an axis of the p-dimensional coordinate system is associated with a concept of the set of queried concepts;

the processor generating a first p-dimensional tensor from an origin of the p-dimensional coordinate system to the first point;

the processor generating a second p-dimensional tensor from an origin of the p-dimensional coordinate system to the second point; and the processor identifying the first relative relevance of the first schema as a function of a parameter selected from the group comprising: a p-dimensional distance between the first point and the second point, a product of the first concept semantic value and the first concept weight within the search-engine query, and a scalar product of the first p-dimensional tensor and the second p-dimensional tensor, wherein the first concept semantic value is associated with the first concept.

12. A computer system comprising a processor, a memory coupled to the processor, and a computer-readable hardware storage device coupled to the processor, the storage device containing program code configured to be run by the processor via the memory to implement a method for ordering answers to a search-engine query, the method comprising:

the processor receiving the search-engine query, wherein the query comprises a set of queried concepts of a general set of concepts;

the processor receiving a set of semantic schemas,
wherein the set of semantic schemas comprises a received subset of concepts of the set of queried concepts and further comprises a plurality of relationships,
wherein a relationship of the plurality of relationships relates two or more concepts of the general set of concepts,
wherein a first schema of the set of semantic schemas comprises a first subset of concepts of the received subset of concepts, a second concept of the general set of concepts, a third concept of the general set of concepts, and a first set of relationships of the plurality of relationships,
wherein a first chain relationship of the plurality of relationships relates the first concept to the second concept, wherein the first chain relationship comprises a first set of link relationships of the plurality of relationships, wherein the first set of link relationships is associated with a first set of link-relationship lengths of a plurality of relationship lengths, wherein a first link relationship of the first set of link relationships is associated with a first link-relationship length of the first set of link-relationship lengths, and wherein a first chain-relationship strength of the plurality of relationship strengths is an inverse function of the first set of link-relationship lengths,
wherein the first subset of concepts comprises a first concept of the received subset of concepts,
wherein a first relationship of the first set of relationships relates the first concept to the second concept,
wherein the first relationship is associated with a subset of liaison strengths of a plurality of relationship strengths,
wherein the first concept is associated with a first concept weight within the search-engine query of a set of concept weights,
wherein the second concept is associated with a second concept strength of a set of concept strengths, and
wherein the second concept is associated with a second semantic weight in the first schema of a set of semantic weights;

the processor determining a first semantic value of the first schema to the query as a function of the first subset of concepts and as a further function of the first set of relationships;

the processor identifying a first relative relevance of the first schema to the query as a function of the first semantic value of the first schema to the query,
wherein said identifying a first semantic value of the first schema to the query is a further function of a first set of concept semantic values within the first schema of a plurality of sets of concept semantic values, and wherein the first concept is associated with a first concept semantic value in the first schema of the first set of concept semantic values, and
wherein said first concept semantic value in the first schema is a function of the subset of liaison strengths and is a further function of the second semantic weight in the first schema, wherein the second semantic weight is a function of the second concept strength, wherein the second semantic weight is a further function of a set of second-concept relationship strengths of the plurality of relationship strengths, and wherein a relationship strength of the set of second-concept strengths is associated with a relationship between the second concept and the third concept; and the processor ordering the first schema among the set of semantic schemas as a function of the first relative relevance.

13. The computer system of claim 12, wherein the determining the first semantic value is a further function of a first set of relationship strengths within the first schema of the plurality of relationship strengths.

14. The computer system of claim 12, wherein the first concept semantic value in the first schema is a function of only one liaison strength of the subset of liaison strengths, and wherein the one liaison strength is the greatest liaison strength of the subset of liaison strengths.

15. The computer system of claim 12, wherein a relationship of the plurality of relationships that relates a pair of equivalent concepts of the general set of concepts is associated with a zero-length or null relationship length of the plurality of relationship lengths.

16. The computer system of claim 12, wherein the identifying a first relative relevance of the first schema comprises the steps of:

the processor plotting the search-engine query as a first point in a p-dimensional coordinate system and further plotting the first schema as a second point in the p-dimensional coordinate system, wherein an axis of the p-dimensional coordinate system is associated with a concept of the set of queried concepts;

the processor generating a first p-dimensional tensor from an origin of the p-dimensional coordinate system to the first point;

the processor generating a second p-dimensional tensor from an origin of the p-dimensional coordinate system to the second point; and the processor identifying the first relative relevance of the first schema as a function of a parameter selected from the group comprising: a p-dimensional distance between the first point and the second point, a product of the first concept semantic value and the first concept weight within the search-engine query, and a scalar product of the first p-dimensional tensor and the second p-dimensional tensor, wherein the first concept semantic value is associated with the first concept.

* * * * *